| United States Patent [19] | [11] 4,311,626 |
|---|---|
| Ona et al. | [45] Jan. 19, 1982 |

[54] SILICONE COMPOSITIONS FOR THE TREATMENT OF FIBERS

[75] Inventors: Isao Ona, Sodegaura; Masaru Ozaki; Katsutoshi Usui, both of Ichihara, all of Japan

[73] Assignee: Toray Silicone Company, Ltd., Tokyo, Japan

[21] Appl. No.: 191,038

[22] Filed: Sep. 25, 1980

[51] Int. Cl.$^3$ .............. C08L 83/04; C08L 83/06; C08K 5/01; D06M 15/66
[52] U.S. Cl. .............. 260/29.2 M; 260/33.65 B; 260/33.85 B; 252/8.8; 525/477; 528/33
[58] Field of Search .............. 252/8.8; 525/477; 528/33; 260/29.2 M, 33.65 B, 33.85 B; 427/387

[56] References Cited

U.S. PATENT DOCUMENTS

| 2,754,284 | 7/1956 | Speck | 260/46.5 |
|---|---|---|---|
| 3,338,943 | 8/1967 | Speier | 260/448.2 |
| 3,597,268 | 8/1971 | Smith | 260/29.2 M |
| 3,729,444 | 4/1973 | Bey et al. | 260/29.2 M |
| 3,766,115 | 10/1973 | Sands | 260/29.1 |
| 3,812,201 | 5/1974 | Bey | 260/824 R |
| 3,884,860 | 5/1975 | Brown | 260/29.2 M |
| 3,962,500 | 6/1976 | Smith | 427/387 |
| 3,980,599 | 9/1976 | Kondo et al. | 260/29.2 M |
| 4,005,231 | 1/1977 | Smith | 528/33 |
| 4,062,999 | 12/1977 | Kondo et al. | 428/391 |
| 4,220,748 | 9/1980 | Hashimoto et al. | 528/38 |

FOREIGN PATENT DOCUMENTS 916544 12/1972 Canada .............. 117/185

*Primary Examiner*—Maria Parrish Tungol
*Attorney, Agent, or Firm*—George A. Grindahl

[57] ABSTRACT

There is disclosed a composition of matter comprising an aminofunctional-radical-containing polydiorganosiloxane and carboxylfunctional-radical-containing polydiorganosiloxane. These compositions are useful for treating fibers to impart improved properties, such as pliability, smoothness, crease resistance, compression recovery and elongation recovery to fiber materials. The improved properties remain through washing and/or dry cleaning of the treated fiber materials.

5 Claims, No Drawings

SILICONE COMPOSITIONS FOR THE TREATMENT OF FIBERS

BACKGROUND OF THE INVENTION

This invention relates to organofunctional silicone agents for the treatment of fibers. More precisely this invention relates to a mixture comprising two organofunctional silicones which can impart durable pliability, smoothness, crease resistance, compression recovery and elongation recovery to fiber materials.

Various agents consisting of organopolysiloxanes and their compositions have been proposed in attempts to impart pliability, smoothness, crease resistance and recovery characteristics to fiber materials.

For example, dimethylpolysiloxane and its emulsion have been used to impart pliability. Treatment agents consisting of a methylhydrogenpolysiloxane, a dimethylpolysiloxane capped with terminal hydroxyl groups and a catalyst for their condensation reaction; or treatment agents consisting of a methylhydrogenpolysiloxane, a vinyl-group-containing diorganopolysiloxane and a catalyst for their addition reaction, are known to be used for imparting durable pliability, crease resistance and recovery characteristics.

Examples of organofunctional silicone agents include an agent consisting of an organopolysiloxane having at least two epoxy groups per molecule and an organopolysiloxane having an amino group, to be used for smoothing organic synthetic fibers, as disclosed in Canadian Pat. No. 916,544; a treatment agent consisting of a diorganopolysiloxane capped at both ends with hydroxyl groups, an organosilane having both an amino group and an alkoxy group per molecule and/or its hydrolyzed and condensed products, as disclosed in U.S. Pat. No. 3,962,500; a treatment agent consisting of an aminoalkyl trialkoxysilane and an epoxy-group-containing organopolysiloxane, as disclosed in U.S. Pat. Nos. 3,980,599 and 4,062,999; a treatment agent comprising a carboxylfunctional silicone, as disclosed in U.S. Pat. No. 3,812,201 and diorganopolysiloxanes capped at both ends with triorganosiloxy groups, having two or more aminoalkyl groups per molecule, as disclosed in U.S. Pat. No. 3,766,115.

However, these conventional agents have their respective drawbacks. For example, the agents primarily consisting of dimethylpolysiloxane oil do not impart durable pliability and smoothness although crease resistance and recovery characteristics are satisfactory. In the case of the agents containing alkoxysilanes as an indispensable component, the alkoxysilanes are easily hydrolyzed when used in emulsions and the life of the treatment bath is undesirably reduced. There is also the drawback that the feel is too stiff. There is another drawback in that the agent is not suitable for the treatment of synthetic fiber products because the curing reaction does not proceed satisfactorily unless the heating conditions are strictly controlled. In the case of the agents containing methylhydrogenpolysiloxane as an indispensable component, there are the drawbacks that the curing reaction does not proceed satisfactorily unless a catalyst is used, and that the life of the treatment bath is too short if a catalyst is used. In the case of the agents primarily consisting of an epoxy-group-containing organopolysiloxane and an amino-group-containing organopolysiloxane, satisfactory durability cannot be obtained unless the treatment is liberally applied.

Copolymers of aminofunctional silicones and carboxylfunctional silicones have been disclosed in U.S. Pat. Nos. 2,754,284 and 3,338,943 as being useful fiber- and film-forming compositions and coating and pulp-treating compositions, respectively. However, these compositions are not suitable for the treatment of fibers to provide a good feel for fiber materials produced therefrom.

BRIEF SUMMARY OF THE INVENTION

It is an object of this invention to overcome the above-mentioned drawbacks of the conventional treatment agents for the treatment of fibers. It is thus an object of this invention to provide agents for the treatment of fibers which impart durable pliability, smoothness, crease resistance, compression recovery and elongation recovery to fiber materials simply by applying the composition to a fiber material and drying at room temperature or by slight heat treatment. An extension of life of the treatment bath is also obtained.

These and other objects are achieved by the fiber-treating compositions of this invention comprising a mixture of an aminofunctional diorganopolysiloxane which is expressed by the formula

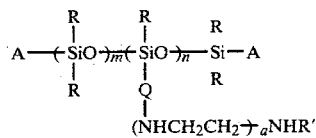

and a carboxylfunctional diorganopolysiloxane which is expressed by the formula

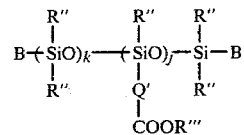

The application of either component (a) or component (b) alone imparts only non-durable pliability and smoothness to fiber materials. With a combination of both components, the amino groups in component (a) react with the carboxyl groups in component (b) when a mixture of components (a) and (b) is simply dried at room, or at slightly elevated, temperature and very strong bonds are formed as a result of crosslinking. Therefore, not only are durable pliability and smoothness imparted, but also crease resistance, compression recovery and elongation recovery can be imparted. The term "durable" implies that the material is durable for a long period with good resistance to washing in water and to dry cleaning.

DETAILED DESCRIPTION OF THE INVENTION

The present invention relates to a fiber-treating composition comprising (a) a polydiorganosiloxane having the formula

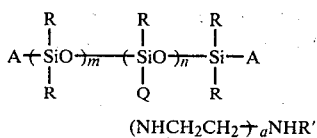

$(NHCH_2CH_2)_a NHR'$ wherein each R represents a monovalent hydrocarbon residue having from 1 to 20 carbon atoms, R' represents a hydrogen atom or a monovalent hydrocarbon residue, A represents R or $-Q-(NHCH_2CH_2)_a NHR'$, Q represents a divalent hydrocarbon residue, m is a positive integer, n is an integer, m+n has a value of at least 10, m/(n+2) has a value of from 5/1 to 500/1, and a is an integer from 0 to 10 and which contains at least two $-Q-(NHCH_2CH_2)_a NHR'$ groups per molecule; and (b) a polydiorganosiloxane having the formula

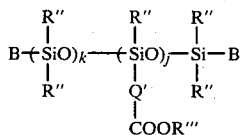

COOR''' wherein each R'' represents a monovalent hydrocarbon residue having from 1 to 20 carbon atoms, R''' represents a hydrogen atom or a monovalent hydrocarbon residue, B represents R'' or $-Q'-COOR'''$, Q' represents a divalent hydrocarbon residue, k is a positive integer, j is an integer, k+j has a value of at least 10, k/(j+2) has a value of from 5/1 to 500/1 and which has at least two $-Q'-COOR'''$ groups per molecule.

Component (a) contains an average of at least two silicon-bonded aminofunctional radicals per molecule, said radicals having the formula $-Q(NHCH_2CH_2)_a NHR'$. These radicals may be bonded to terminal silicon atoms (A denoting $-Q(NHCH_2CH_2)_a NHR'$) and/or backbone silicon atoms of the polydiorganosiloxane (a).

Examples of R' radicals in the aminofunctional radical include the hydrogen radical and monovalent hydrocarbon residues such as methyl, ethyl, propyl and phenyl.

Examples of divalent hydrocarbon residues denoted by Q in the aminofunctional radical include alkylene radicals, such as $-CH_2-$, $-CH_2CH_2-$, $-CH_2CH_2CH_2-$, $-CH_2CH(CH_3)CH_2-$, $-(CH_2)_4-$, and alkylenearylene radicals, such as $-(CH_2)_2C_6H_4-$. Q is preferably the propylene radical.

The value of a in the aminofunctional radicals can be 0, thereby defining monoamino radicals of the formula $-QNHR'$, or an integer from 1 to 10, thereby defining polyamino radicals, such as $-QNHCH_2CH_2NHR'$, $-QNHCH_2CH_2NHCH_2CH_2NHR'$ etc. A preferred aminofunctional radical in the compositions of this invention has the formula $-CH_2CH_2CH_2NHCH_2CH_2NH_2$.

Examples of monovalent hydrocarbon residues denoted by R in component (a) include alkyl radicals, such as methyl, ethyl, propyl, butyl, pentyl; alkenyl radicals, such as vinyl; halogenated radicals, such as 3,3,3-trifluoropropyl and aryl radicals, such as phenyl. The R radicals in component (a) can be identical or not, as desired. Preferably all R radicals are methyl radicals although a mixture of methyl radicals and other monovalent hydrocarbon residues, such as phenyl or vinyl, is very often used.

In the formula for component (a) m is an integer greater than zero and n is an integer equal to or greater than zero. Of course, it is to be understood that polydiorganosiloxanes do not constitute a single molecular species and that the values of m and n in the component (a) will be average values.

The average values of m and n are such that the value of the sum of m+n is at least 10 and the value of the quotient m/(n+2) is from 5/1 to 500/1. For example, when n is zero, m must be at least 10, but not more than 1000. Of course, in this case, all radicals denoted by A are $-Q(NHCH_2CH_2)_a NHR'$ radicals. Similarly, when n has a value of 3, m must have a value of from 25 to 2500. In this case radicals denoted by A can be R radicals and/or $-Q(NHCH_2CH_2)_a NHR'$ radicals.

If the value of m+n is less than 10, the imparting of pliability and smoothness to a textile are poor due to adsorption of the component into the interior of the fibers. If it exceeds 1000, emulsification of the component is difficult. Therefore, the value of m+n is preferably from 100 to 1000. If the value of m/(n+2) is less than 5/1, the imparting of pliability and smoothness to the textile are poor, while if it exceeds 500/1, the imparting of crease resistance, compression recovery and elongation recovery are poor.

A preferred aminofunctional-radical-containing polydiorganosiloxane has the formula $Me_3SiO(Me_2SiO)_m(MeSiO)_n SiMe_3$
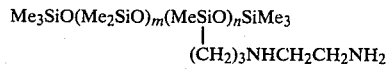
$(CH_2)_3 NHCH_2CH_2NH_2$ Polydiorganosiloxanes bearing aminofunctional radicals are well known in the silicones art; some are commercially available. Their preparation needs no further elaboration here. A suitable preparative method can be found in U.S. Pat. No. 3,512,915, the specification of which is hereby incorporated herein by reference.

Component (b) contains an average of at least two silicon-bonded carboxylfunctional radicals per molecule, said radicals having the formula $-Q'COOR'''$. These radicals may be bonded to terminal silicon atoms (B denoting $-Q'COOR'''$) and/or backbone silicon atoms of the polydiorganosiloxane (b).

Examples of divalent hydrocarbon residues denoted by Q' in the carboxylfunctional radical are the same as those noted for Q above. The Q' radicals in component (b) may be the same as, or different from, the Q radicals in component (a).

R''' in the carboxylfunctional radical can be hydrogen, thereby defining carboxylic-acid-functional radicals of the formula $-Q'COOH$, such as $-CH_2CH_2COOH$; or a monovalent hydrocarbon residue, such as methyl, ethyl and hexyl, thereby defining carboxylic-ester-functional radicals, such as $-CH_2CH_2COOCH_3$ and $-CH_2CH(CH_3)COOCH_2CH_3$.

Examples of monovalent hydrocarbon residues denoted by R'' in component (b) include methyl, ethyl, propyl, benzyl, dodecyl, stearyl, 3,3,3-trifluoropropyl, beta-phenylethyl, alpha-methyl-beta-phenylethyl, vinyl and phenyl. The R'' radicals in component (b) can be identical or not, as desired. Preferably all R'' radicals are methyl although a mixture of methyl radicals and other monovalent hydrocarbon residues, such as phenyl or vinyl, is very often used.

In the formula for component (b) k is an integer greater than zero and j is an integer equal to or greater than zero. Of course, it is to be understood that polydiorganosiloxanes do not constitute a single molecular species and that the values of k and j in component (b) will be average values.

The average values of k and j are such that the value of the sum k+j is at least 10 and the value of the quotient k/(j+2) is from 5/1 to 500/1. Of course, when j is zero all radicals denoted by B in component (b) must be —Q'COOR''' radicals.

If the value of k+j is less than 10, the imparting of pliability and smoothness to a textile are poor due to adsorption of the component into the interior of the fibers. If it exceeds 1000, emulsification of the component is difficult. Therefore, the value of k+j is preferably from 100 to 1000. If the value of k/(j+2) is less than 5/1, the imparting of pliability and smoothness to a textile are poor, while if it exceeds 500/1 the imparting of crease resistance, compression recovery and elongation recovery are poor.

A preferred carboxylfunctional-radical-containing polydiorganosiloxane has the formula

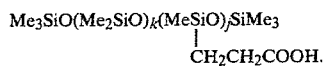
$$\underset{\mathrm{CH_2CH_2COOH}}{\mathrm{Me_3SiO(Me_2SiO)}_k\mathrm{(MeSiO)}_j\mathrm{SiMe_3}}$$

Polydiorganosiloxanes bearing carboxylfunctional radicals are well known in the silicone art; their preparation needs no elaboration here. A suitable method for their preparation is disclosed in U.S. Pat. No. 4,076,695, the specification of which is hereby incorporated herein by reference.

A treatment bath is prepared by dissolving components (a) and (b), for example, in an organic solvent such as toluene, xylene, benzene, n-hexane, heptane, mineral terpene, perchloroethylene or chlorothene. The treatment solution can be applied to fiber materials by any method such as spraying, applying with a roller or immersion. The solution can be emulsified with an appropriate emulsifier, such as sulfates of higher alcohols, alkylbenzenesulfonates, higher alcohol polyoxyalkylene adducts, higher fatty acid polyoxyalkylene adducts, alkylphenol polyoxyalkylene adducts and higher fatty acid sorbitan esters, before use and then the emulsion can be applied to fiber materials by spraying, applying with a roller or immersion.

Both components can be dissolved or emulsified individually and a mixture of both solutions or emulsions can be applied to the fiber materials. Alternatively, one of these solutions or emulsions is applied first to the fiber materials and subsequently the other solution or emulsion is applied. The important point is that the treatment can be carried out by any arbitrary methods as long as both components coexist on the fiber materials. However, for homogeneous treatment of the fibers, the fiber materials are preferably treated with a treatment agent prepared by combining both components in advance.

The treatment agent of this invention is typically applied to fiber materials in an amount of 0.1 to 4 wt% as a total of both components, based on the weight of the fiber material.

When the organic solvent and/or the water is subsequently removed by allowing the material to stand at room temperature, or by blowing hot air on the materials, or by heating, a cross-linking reaction occurs rapidly between the amino groups in component (a) and the carboxyl groups (acid and/or ester) in component (b). As a result, durable pliability, smoothness, crease resistance, compression recovery and elongation recovery can be imparted to the treated fiber material. Thus, in a preferred embodiment the compositions of this invention contain an equal, or approximately equal, number of —Q—(NHCH$_2$CH$_2$)$_a$NHR' radicals and —Q—COOR''' radicals. In terms of work efficiency and improvement in durability, the treated fiber materials are preferably dried by blowing hot air on them or by heating instead of by allowing them to stand at room temperature. If desirable, an appropriate catalyst for curing can be added.

The fiber materials to be treated with this treatment agent may include natural fibers such as wool, silk, linen, cotton and asbestos, regenerated fibers such as rayon and acetate, synthetic fibers such as polyester, polyamide, vinyl, polyacrylonitrile, polyethylene, polypropylene and spandex, glass fibers, carbon fibers and silicon carbide fibers. With respect to the shapes of the materials, the following can be treated: staples, filaments, tows, yarns, woven fabrics, knitted fabrics, nonwoven fabrics and resin-coated cloths. However, the materials can be treated effectively if they are treated continuously in a sheet form as in woven fabrics, knitted fabrics, nonwoven fabrics and mattress filler flocking.

The following examples are disclosed to illustrate, but not limit, the present invention. All parts, ratios and percentages are by weight unless otherwise specified. All viscosities were measured at 25° C. Me denotes the methyl radical.

Crease resistance of textile samples was measured by the Monsanto method as described in JIS L 1079, "Test Method for Synthetic Fiber Woven Fabrics, for Untreated Fabric and Various Treated Fabrics With or Without Dry Cleaning". Briefly this method is conducted as follows:

A test specimen with a size of 1 cm×4 cm is cut. This test specimen is folded in two so that each side of the fold has a size of 1 cm×2 cm. The folded test specimen is inserted between glass plates and left undisturbed with a load of 500 g for 5 minutes. After releasing the load, the test specimen is carefully picked up with a pair of tweezers and the folded section is hung over a taut wire with a diameter of 0.51 mm. After 5 minutes, the angle of opening of the fabric is measured as the angle ($\alpha$) subtended by two straight lines drawn from the axis of the taut wire to the center of each folded section of the sample.

The crease resistance (A), expressed in %, is calculated from the following formula as an average value of 10 sets of data determined respectively along the vertical and horizontal directions of the textile and rounded to the nearest integer $$A\ (\%) = (\alpha/180) \times 100$$

EXAMPLE 1

An amino-group-containing organopolysiloxane having the formula

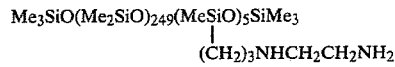
$$\underset{(\mathrm{CH_2})_3\mathrm{NHCH_2CH_2NH_2}}{\mathrm{Me_3SiO(Me_2SiO)}_{249}\mathrm{(MeSiO)}_5\mathrm{SiMe_3}}$$

(viscosity 1100 cSt, 1 part) and a carboxyl-group-containing organopolysiloxane of the formula

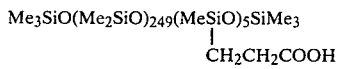
$$Me_3SiO(Me_2SiO)_{249}(MeSiO)_5SiMe_3$$
$$| \\ CH_2CH_2COOH$$

(viscosity 1400 cSt, 1 part) were dissolved in toluene (98 parts) and the solution obtained served as a treatment solution. Changes in viscosity and gelation did not occur when this treatment solution was left standing at room temperature for 5 days.

A 100% wool sharkskin weave man's suit fabric was immersed in this treatment solution and subsequently removed from the solution. The fabric was squeezed using a mangle roll to such a degree that the amount of the organopolysiloxanes which adhered was 1.5%, and dried in air. Subsequently, the fabric was heat-treated at 150° C. for 3 minutes.

For comparison, treatment solutions were prepared under the same conditions as described above except that either the amino-group-containing organopolysiloxane alone or the carboxyl-group-containing organopolysiloxane alone was used. The fabric was treated under the same conditions.

The treated fabrics were divided into two pieces with a scissors. One of these pieces was dipped in a mineral terpene with a bath ratio of 1:200 with stirring for 15 minutes. This process was applied as a surrogate for dry cleaning. The dry cleaning was repeated three times. The crease resistance was measured by the above-described Monsanto method.

As shown in Table I, the fabric treated with the treatment agent of this invention demonstrated excellent crease resistance and the decrease in this characteristic due to dry cleaning was almost negligible.

TABLE I

| Test specimens | Crease resistance, % | |
|---|---|---|
| | Before dry cleaning | After dry cleaning |
| Untreated fabric | 68 | 69 |
| Fabric treated with the treatment agent of this invention | 87 | 85 |
| Fabric treated with the amino-group containing organopolysiloxane alone | 80 | 74 |
| Fabric treated with the carboxyl-group containing organopolysiloxane alone | 79 | 73 |

EXAMPLE 2

An amino-group-containing organopolysiloxane of the formula

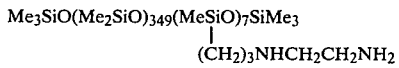
$$Me_3SiO(Me_2SiO)_{349}(MeSiO)_7SiMe_3$$
$$| \\ (CH_2)_3NHCH_2CH_2NH_2$$

(viscosity 2200 cSt, 1 part) and a carboxyl-group-containing organopolysiloxane of the formula

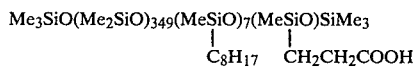
$$Me_3SiO(Me_2SiO)_{349}(MeSiO)_7(MeSiO)SiMe_3$$
$$| \quad\quad | \\ C_8H_{17} \quad CH_2CH_2COOH$$

(viscosity 2550 cSt, 1 part) were dissolved in perchloroethylene (98 parts) and the resulting solution served as a treatment solution. Changes in viscosity and gelation did not occur when this treatment solution was left standing at room temperature for 5 days.

A two-bar weft knitted wooly polyethylene terephthalate (75 denier) fabric was immersed in this treatment solution and subsequently removed from the solution. The fabric was squeezed using a mangle roll to such a degree that the amount of the organopolysiloxane which adhered was 1.0%, and dried at 110° C. for 5 minutes.

For comparison, treatment solutions were prepared under the same conditions as described above except that either the amino-group-containing organopolysiloxane alone or the carboxyl-group-containing organopolysiloxane alone was used. The fabric was treated under the same conditions.

With respect to the untreated knitted fabric and the various treated knitted fabrics, the elongation recovery was measured after the elongation/recovery process was repeated ten times at a percentage of elongation of 40% and 80% according to JIS L 1080 "Test Method for Stretchability of Woven Fabrics." The feel of the fabrics was examined manually. As shown in Table II, the knitted fabrics treated with the treatment solution of this invention demonstrated excellent elongation recovery. The fabric had an appropriate silky feel and a luxuriant resiliency. The fabric also had excellent feel.

TABLE II

| Test specimens | elongation recovery, % | | Feel |
|---|---|---|---|
| | 40% elongation | 80% elongation | |
| Untreated fabric | 76 | 77 | Stiff and creaky. |
| Knitted fabric treated with the treatment agent of this invention | 96 | 95 | Silky, high resiliency, excellent. |
| Knitted fabric treated with the amino-group-containing organopolysiloxane alone | 81 | 91 | Slight silky, relatively good. |
| Knitted fabric treated with the carboxyl-group-containing organopolysiloxane alone | 87 | 89 | Minimal silky, relatively good. |

EXAMPLE 3

The amino-group-containing organopolysiloxane used in Example 2 (35 parts), water (5 parts) and a polyoxyethylene nonylphenol ether (a mixture of three types: 2 mol, 5 mol and 25 mol ethylene oxide adducts, adjusted to HLB 12.0, 5 parts) were placed in a container and the mixture was blended thoroughly using a stirrer. Subsequently, water (45 parts) was added to the mixture and an emulsion was obtained.

Separately, the carboxyl-group-containing organopolysiloxane used in Example 2 (35 parts), water (5 parts), and the polyoxyethylene nonylphenol ether described above (adjusted to HLB 11.5, 5 parts) were placed in a container and the mixture was blended thoroughly using a stirrer. Subsequently, water (45 parts) was added to the mixture and an emulsion was obtained.

The above-mentioned two types of treatment agents were mixed at a ratio of 1:1 and the mixture was diluted with water to such a degree that the amount of the organopolysiloxanes was 2%. The dilute mixture of the treatment agents served as a treatment solution. Changes in viscosity, gelation and phase separation did not occur when the treatment solution was left standing at room temperature for 5 days.

The knitted fabric used in Example 2 was treated with this treatment solution under the same conditions as in Example 2. Both the elongation recovery and feel of the treated fabric were examined.

As shown in Table III, the knitted fabric treated with the treatment agent of this invention demonstrated excellent elongation recovery. The fabric had an appropriate silky feel and a luxuriant resiliency. The fabric also had excellent feel.

TABLE III

| Test specimens | Elongation recovery, % | | Feel |
|---|---|---|---|
| | 40% elongation | 80% elongation | |
| Untreated fabric | 75 | 75 | Stiff and creaky. |
| Knitted fabric treated with the treatment agent of this invention | 94 | 95 | Silky, high resiliency, excellent. |
| Knitted fabric treated with the amino-group-containing organopolysiloxane alone | 89 | 90 | Slight silky, relatively good. |
| Knitted fabric treated with the carboxyl-group-containing organopolysiloxane alone | 85 | 86 | Minimal silky, relatively good. |

EXAMPLE 4

A treatment solution was prepared using the amino-group-containing organopolysiloxane used in Example 1 (1 part), a carboxyl-group-containing organopolysiloxane of the formula

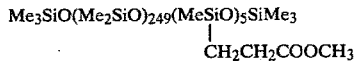

$$Me_3SiO(Me_2SiO)_{249}(MeSiO)_5SiMe_3$$
$$|$$
$$CH_2CH_2COOCH_3$$

(viscosity 1200 cSt, 1 part) and xylene (98 parts). A 100% wool sharkskin weave men's suit fabric was treated with this treatment solution under the same conditions as in Example 1. The crease resistance was measured as in Example 1. The crease resistance before dry cleaning was 86, and the crease resistance after dry cleaning was also 86. The treated fabric demonstrated excellent pliability.

That which is claimed is:

1. A fiber-treating composition comprising
   (a) a polydiorganosiloxane having the formula

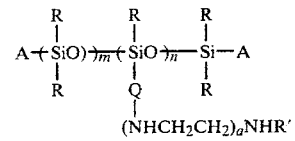

wherein each R represents a monovalent hydrocarbon residue having from 1 to 20 carbon atoms, R' represents a hydrogen atom or a monovalent hydrocarbon residue, A represents R or $-Q-(NHCH_2CH_2)_a NHR'$, Q represents a divalent hydrocarbon residue, m is a positive integer, n is an integer, m+n has a value of at least 10, m/(n+2) has a value of from 5/1 to 500/1, and a is an integer from 0 to 10 and which contains at least two $-Q-(NHCH_2CH_2)_a NHR'$ groups per molecule; and (b) a polydiorganosiloxane having the formula general formula

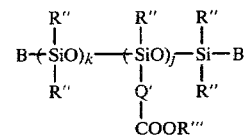

wherein each R" represents a monovalent hydrocarbon residue having from 1 to 20 carbon atoms, R''' represents a hydrogen atom or a monovalent hydrocarbon residue, B represents R" or $-Q-COOR'''$, Q' represents a divalent hydrocarbon residue, k is a positive integer, j is an integer, k+j has a value of at least 10, k/(j+2) has a value of from 5/1 to 500/1 and which has at least two $-Q'-COOR'''$ groups per molecule.

2. A composition according to claim 1 wherein the total number of $-Q-(NHCH_2CH_2)_a NHR'$ radicals is equal to or approximately equal to the total number of $-Q'-COOR'''$ radicals.

3. A composition according to claim 1 or 2 wherein component (a) has the formula

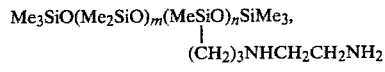

$$Me_3SiO(Me_2SiO)_m(MeSiO)_nSiMe_3,$$
$$|$$
$$(CH_2)_3NHCH_2CH_2NH_2$$

component (b) has the formula

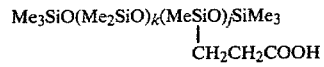

$$Me_3SiO(Me_2SiO)_k(MeSiO)_jSiMe_3$$
$$|$$
$$CH_2CH_2COOH$$

and Me denotes the methyl radical.

4. A composition according to claim 3 further comprising an organic solvent for components (a) and (b).

5. A composition according to claim 3 further comprising water as an emulsion medium for components (a) and (b).

* * * * *